3,102,830
ESTABLISHMENT OF pH VALUE OF A PHOSPHORIC ACID SOLUTION BY ITS REACTION WITH IRON PRIOR TO ITS USE TO TREAT FERROUS SURFACES
Guillaume Duchange, Neuilly-sur-Seine, France, assignor to Bernard Titeux, Paris, France
No Drawing. Filed Mar. 20, 1961, Ser. No. 96,650
Claims priority, application France Mar. 21, 1960
4 Claims. (Cl. 148—6.16)

The present invention relates to a novel anti-corrosion product for the treatment of metallic surfaces, and to a method for preparing said product.

The known corrosion-inhibiting products, and more particularly the so-called wash-primers, are unable to exert their functions unless the surface to be protected has been previously descaled and thoroughly cleaned; in fact this surface must be perfectly free of any traces of oxide or foreign matter so as to allow the aforementioned inhibiting products to be applied thereon.

It is an object of the present invention to provide a product which may be applied directly on the surface of the scaled or oxidized metal, i.e. on the rust or scale layer, said product being able to transform said rust or scale into phosphates and chromates, and further to form a protective film on the metal surface.

It is another object of the invention to provide an anti-corrosion product which combines the effects of descaling and inhibiting, said effects being obtained by a single application of said product, without intermediate and eventually final rinsing, whereby several operations necessary in the known methods for protecting metal surfaces, as well as the use of a plurality of products can be eliminated.

Still another object of the invention is to provide a novel product as specified herein-before, which constitutes a fast-acting agent for descaling and rust removal at a medium temperature of 18° C., without entailing any dangerous attack of the sound base metal and without formation of hydrogen inlcusions, said product constituting also a cold phosphatizing passivator or inhibitor by forming polyvalent inorganic phosphates, while said product further constitutes a corrosion inhibitor due to the action of metal chromates of constant equilibrium potential, said product constituting, at the same time, an ionic stabilizer, due to the action of cycle organic functions.

The aforementioned known wash-primers and anti-corrosion paints or similar products are obtained by mixing expensive and comparatively unstable chemical substances, particularly alcohols and vinyl-base resins, which must be used immediately after having been prepared.

It is therefore another object of the present invention to provide a product allowing for conservation during a practically illimited period of time, due to the fact that the components of said product, once they have reacted with each other, are stabilized at the molecular level (i.e. molecule by molecule).

Still another object of the invention is to provide a method for preparing the aforementioned novel product.

A further object of the invention is to provide a method for preparing the anti-corrosion product mentioned herein-above, wherein the final formation of said product, obtained in the form of a solution, is controlled by a direct colorimetric indication corresponding to a constant pH value, whereby the preparation of the product is substantially facilitated.

In order that these objects be achieved, an anti-corrosion product according to one embodiment of the invention is constituted by the product of the reaction with metallic iron of an aqueous solution containing a salt of an alkali metal and chromate acid, a salt of an alkali metal and phosphoric acid, ortho-phosphoric acid, and zinc oxide.

In another embodiment an anti-corrosion product according to the invention is constituted by the product of the reaction with metallic iron of an aqueous solution containing a salt of an alkali metal and chromate acid, a salt of an alkali metal and nitric acid, a salt of an alkali metal and phosphoric acid, ortho-phosphoric acid and zinc oxide.

Preferably, the product according to the first-mentioned embodiment further contains cellulose esters, whereby said product, when applied on a metal surface, firmly adheres thereto, and forms thereon an indelible protective film, after drying.

It is obvious that the novel product allows substantial gains in man-hours, raw material and equipment to be achieved, as compared with the product used according to the known method of protecting metal surfaces against corrosion. Furthermore, the product according to the invention and the method for preparing the same allows a substantial amount of calorific energy to be economized, which constitutes a considerable economic advantage, as compared to known products and methods, in which the descaling and phosphatizing or similar inhibiting operations cannot be carried out simultaneously.

The method for preparing the novel product will be described herein-after by means of several examples which are, however, not to be considered as constituting a limitation of the scope of the invention. The following examples refer each to the preparation of the novel product in form of a solution, using one liter of liquid components.

*Example I*

The electrolyte for an inhibiting and descaling bath is prepared in the form of an aqueous solution, using the following constituents in the indicated proportions:

Water—520 cm.$^3$ to which is added potassium bichromate 10 to 12 grs. which is allowed to dissolve completely; to the resulting solution is added potassium nitrate 5 to 6 grs., which is allowed to dissolve; thereafter is added trisodium phosphate 5 to 6 grs., which is also allowed to dissolve completely. The solution thus obtained is then poured into, and thoroughly mixed with 480 cm.$^3$ of 58° B. ortho-phosphoric acid. Then is added zinc oxide in the amount of 7.60 grs. which will dissolve very rapidly and begin to act on the bichromate in the presence of the acid, thus forming a soluble zinc-chromate.

The containers or vats used for the preparation of the electrolyte must be made of wood or plastic material in order to avoid any contamination due to contact of the solution with a metal.

The resulting solution is orange-coloured. In order to activate the synthesis of chromate and phosphate, i.e. the transformation of the used components into soluble salts of the chromic and phosphoric acids, a piece of ordinary steel having a surface area of approximately 10 cm$^2$. is immersed at the end of a textile rope for a period of 5 to 8 hours, so as to act upon the solution, until the latter has become transparent and shows a characteristic chrome-green colour, which indicates that pH value of 1.5 has been attained.

The reactions are now completed; the piece of steel is removed and the solution is ready for use and will remain stable for an unlimited period of time when stored in containers made of inert material, such as glass or plastic material.

In order to utilize the solution in the form of a bath for descaling and rust removal said solution is diluted at ambient temperature with cold water in the proportion of 1 part (by volume) of solution to 2 parts (by volume) of water.

Example II

This example relates to preparing a solution which is to applied by coating, for instance by means of a brush, or a spray-gun, i.e. a solution for treating ferrous surfaces which cannot be immersed.

The following constituents are used:

Water—760 cm.$^3$ to which is added potassium bichromate 12 grs. which is allowed to dissolve completely; to this solution is added tri-sodium phosphate 6 grs. which is allowed to dissolve; to the resulting mixture is then added 58° B. ortho-phosphoric acid 240 cm.$^3$; after thoroughly mixing there will be added: zinc-oxide 7.60 grs.

The anode made of ordinary steel is then allowed to react with the bath for about 6 to 8 hours until the latter shows a green colour indicating a pH value of 2.5.

When the solution is ready, a quantity of 10 to 12 grs. of cellulose esters (methyl cellulose, carboxy-methyl cellulose) is added which will form a gel at the contact with the liquid, thus enabling the solution to adhere firmly to the metal surface to be treated, and forming, when dried, an indelible film.

It is possible to replace the cellulose esters by plastic materials able to form a film and to be previously dissolved in a water-diluted acid medium, but the instability of such plastic materials presents a hazard when it is desirable to store the solution for a substantial period of time, even when containers made of inert material are used.

Example III

In Examples I and II it is possible to substitute:

Sodium bichromate for potassium bichromate
Sodium nitrate for potassium nitrate
Mono-sodium phosphate or di-sodium phosphate for tri-sodium phosphate
Zinc sulphate for zinc oxide.

Wetting agents, emulsifiers or surface active agents may be added in view of promoting the ionic stabilization; however, these products must be either strictly neutral or anionic, and they must not exceed the amount of $\frac{1}{1000}$ with respect to the total amount of solution in order to avoid the formation of zones constituting electrical "micro-cells" due to latent humidity or delays in drying.

The process involved is based upon the action of the PO 4—ions released by the ionic dissociation of the molecules of ortho-phosphoric acid, i.e. the acid solution, when reacting with the steel plate, releases H+ hydrogen ions from the $H_3PO_4$ and then forms soluble chrome phosphates and zinc phosphates which remains stable at pH values up to 4.

Consequently, when said solution which constitutes, in fact, an electrolyte, turns from turbid orange-brown to transparent peppermint green and stabilizes at pH 1.5, this is an indication that the synthesis has been achieved. The iron plate the function of which is, in fact, that of a catalyzer, is then removed. When the product according to the invention is used in the form of a bath or coating, another acid reaction on the metal to be treated and the oxides thereof occurs and fixes the corrosion-inhibiting $Zn++$ and $Cr+++$ cations, as well as the complex phosphates, thus achieving a passivating (or inhibiting) coating and forming an excellent retaining base for paints.

What is claimed is:

1. An anti-corrosion treatment of ferrous surfaces, consisting in dissolving in 760 parts by volume of water 12 parts by weight of a salt selected from the group consisting of sodium bichromate and potassium bichromate, 6 parts by weight of a salt selected from the group consisting of trisodium phosphate, disodium phosphate and monosodium phosphate, 240 parts by volume of 58° B. orthophosphoric acid, adding to the resulting solution 7.60 parts by weight of a zinc compound selected from the group consisting of zinc oxide and zinc sulfate, reacting the mixture so formed with iron by immerging therein an iron piece until said mixture shows a green color and has a pH value of 2.5, adding 10 to 12 parts by weight of a cellulose ester to the green-colored mixture, and applying the same to said ferrous surfaces.

2. An anti-corrosion treatment as claimed in claim 1, further comprising the step of adding to said mixture at least one of the substances of the group consisting of wetting agents, emulsifiers, and surface activators, in an amount not exceeding 1 part of added substance for 1000 parts of said mixture.

3. An anti-corrosion treatment of ferrous surfaces, consisting in dissolving in 520 parts by volume of water 10 to 12 parts by weight of a salt selected from the group consisting of potassium bichromate and sodium bichromate, 5 to 6 parts by weight of a salt selected from the group consisting of sodium nitrate and potassium nitrate, 480 parts by volume of 58° B. orthophosphoric acid, adding to the resulting solution 7.60 parts by weight of a zinc compound selected from the group consisting of zinc oxide and zinc sulfate, reacting the mixture so formed with iron by immerging therein a piece of iron having a surface area of substantially 10 cm.$^2$ until said mixture shows a green color and has a pH value of 1.5, adding 10 to 12 parts by weight of a cellulose ester to said green-colored mixture, and applying the resulting mixture to said ferrous surfaces.

4. An anti-corrosion treatment as claimed in claim 3, further comprising the step of adding to said mixture at least one of the substances of the group consisting of wetting agents, emulsifiers, and surface activators, in an amount not exceeding 1 part of added substance for 1000 parts of said mixture.

References Cited in the file of this patent

UNITED STATES PATENTS

| | | |
|---|---|---|
| 2,516,685 | Douty | July 25, 1950 |
| 2,711,391 | Kahler | June 21, 1955 |
| 2,798,016 | Lesser | July 2, 1957 |
| 2,800,422 | Piccinelli | July 23, 1957 |
| 2,900,222 | Kahler et al. | Aug. 18, 1959 |